A. G. FITZ GERALD.
INDICATING DEVICE FOR MOTOR VEHICLES.
APPLICATION FILED OCT. 17, 1916.

1,320,218.

Patented Oct. 28, 1919.
2 SHEETS—SHEET 1.

A. G. FITZ GERALD.
INDICATING DEVICE FOR MOTOR VEHICLES.
APPLICATION FILED OCT. 17, 1916.
1,320,218.
Patented Oct. 28, 1919.
2 SHEETS—SHEET 2.
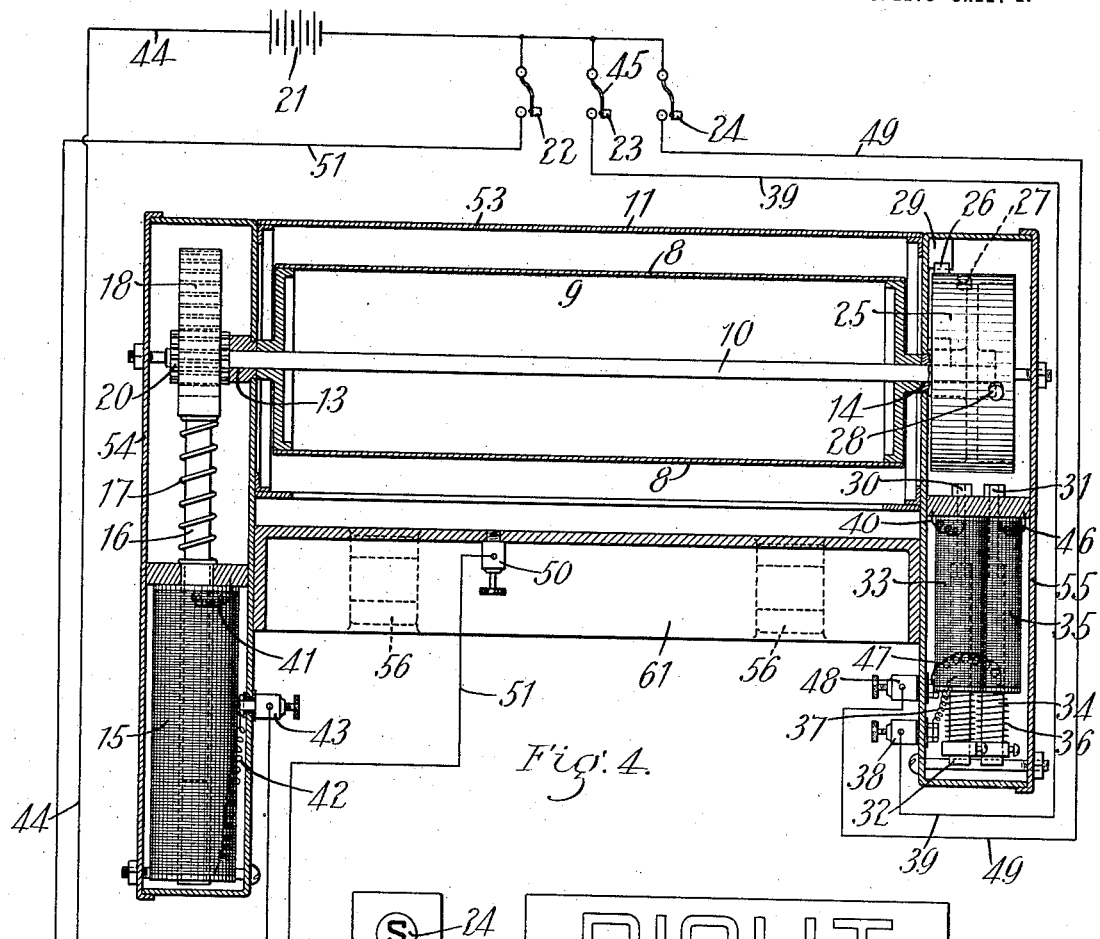
Fig. 4.
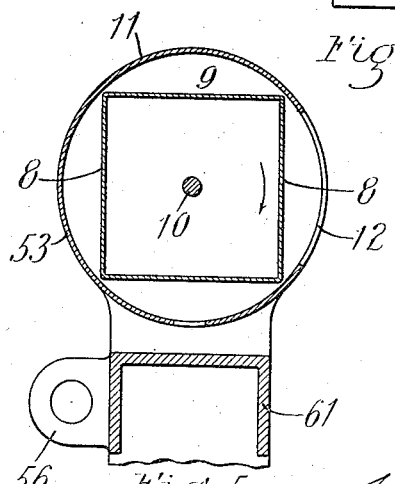
Fig. 5.
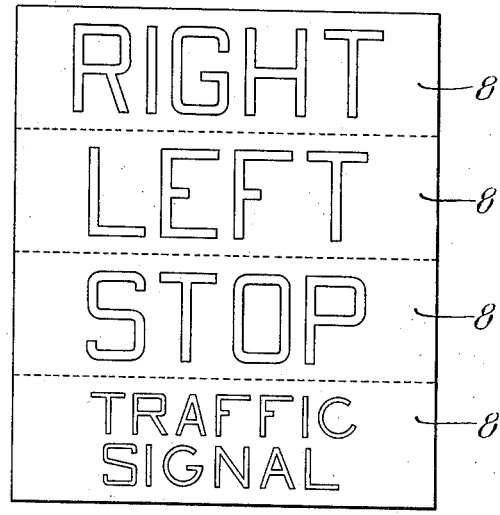
Fig. 7.
Fig. 6.
Inventor:
Arthur G. Fitz Gerald
by his attorney,

UNITED STATES PATENT OFFICE.

ARTHUR G. FITZ GERALD, OF WINCHESTER, MASSACHUSETTS.

INDICATING DEVICE FOR MOTOR-VEHICLES.

1,320,218.   Specification of Letters Patent.   Patented Oct. 28, 1919.

Application filed October 17, 1916. Serial No. 126,210.

*To all whom it may concern:*

Be it known that I, ARTHUR G. FITZ GERALD, a citizen of the United States, residing at Winchester, in the county of Middlesex and State of Massachusetts, have invented new and useful Improvements in Indicating Devices for Motor-Vehicles, of which the following is a specification.

This invention relates to improvements in indicating devices for vehicles and especially motor vehicles and it has for its object to provide a simple, compact device adapted to be attached to the rear of the vehicle where it may be readily seen by following vehicles and indicate to them whether the vehicle is to make a right or left turn or to stop.

Another object of the invention is to provide a device of the nature referred to which may be operated by electricity from the operator's seat by the mere pressing of one or more push buttons or switches, the release of any one of said switches being sufficient to return the indicator to its normal position.

It is further desirable to have the device constitute a support for the number plate of the vehicle which is maintained in close proximity to the direction indicating characters which may be illuminated by the same means which illuminate the direction indicating signal.

The invention consists in the combination and arrangement of parts set forth in the following specification and particularly pointed out in the claim.

Referring to the drawings:

Fig. 4 is a section taken substantially on the line 4—4 of Fig. 2.

Fig. 5 is a section taken on the line 5—5 of Fig. 1, illustrating the cross sectional form of the rotary member and the casing within which said member is adapted to rotate.

Fig. 6 is a development of the four sides of the rotary member, illustrating the direction indicating characters in their relative positions.

Fig. 7 is a detail front elevation of the plate bearing the push buttons with the ends of the buttons provided with letters, such as shown, for indicating the characters on the several sides of the rotary member.

Like numerals refer to like parts throughout the several views of the drawings.

Figure 1:
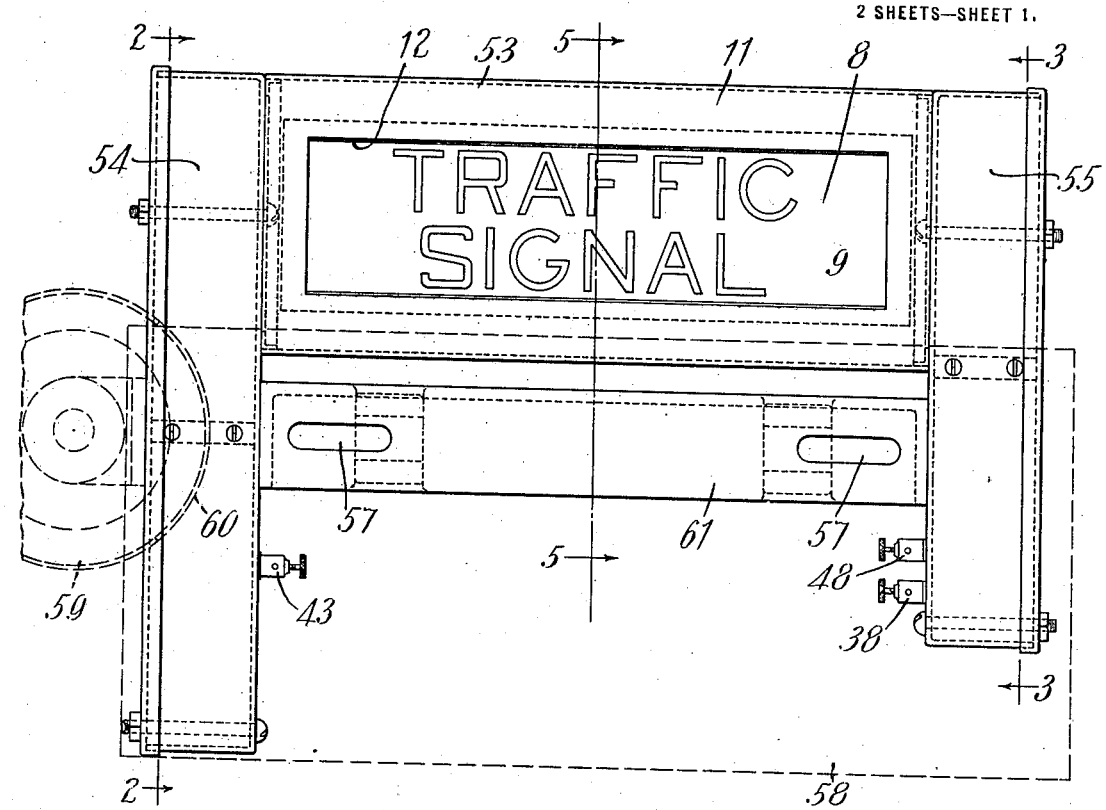
Figure 1 is an elevation of an indicating device embodying my invention, preferably as viewed from the rear of the vehicle bearing said device, a number plate and lamp being indicated in dotted lines in said figure.

In the drawings, 8, 8 represent signal members, in the present case four in number, one of which bears the word "Right," another the word "Left," another the word "Stop" and still another the words "Traffic signal." The signal members 8 preferably constitute the sides of a rotary member 9 mounted upon a shaft 10 preferably disposed with its axis horizontal.

In order that the operator of the car following the one bearing the device may not be confused or misunderstand the signal all except one of the signals are preferably obscured from view, at least from the rear. The preferred method of accomplishing this result is to provide a casing 11 provided with a cylindrical portion adapted to entirely inclose the rotary member 9.

The casing 11 has an opening 12 of a size sufficient to display all of the characters on the signal members 8 one at a time. The rotary member 9 is secured to the shaft 10 and the shaft 10 is journaled to rotate in bearings 13 and 14 of the casing 11. The normal position of the rotary member 9 is with the face bearing the words "Traffic signal" in register or alinement with the opening 12 in the casing 11 which is assumed to be the position of the rotary member in Fig. 5 and also as shown in Fig. 1.

Electrical instrumentalities are provided for rotating said rotary member so as to present a predetermined one of said signals into register with said opening 12. The instrumentalities for accomplishing this result preferably include a solenoid 15 having an armature 16 slidably arranged to move longitudinally of the coils constituting said solenoid.

A spring 17 preferably encircles the armature 16 and is adapted to normally retain said armature at one end of the coils of said solenoid. A rack 18 is attached to the end of the armature 16, said rack having teeth 19 meshing with the teeth of a small gear 20. The gear 20 is, in turn, secured to the shaft 10. The solenoid 15 is connected in circuit with a suitable battery 21 and a plurality of switches preferably push buttons 22, 23, and 24 which, when depressed, close the electric circuit including the solenoid 15, whereupon said solenoid will be energized and the armature thereof directed against the action of the spring 17.

The rack 18 during such movement of said armature causes the gear 20 to rotate and this, in turn, rotates the member 9. The instrumentalities for presenting predetermined signal members into register with the opening 12 also include selective means or, in other words, means for stopping said rotary member at certain points in the rotation thereof.

To accomplish this result a cylindrical member 25 is preferably attached to the shaft 10, said member having distributed about its periphery a number of projections, preferably 3, 26, 27 and 28. The projection 26 normally engages a fixed stop 29 within the casing in which position it is held by the spring 17.

The projections 27 and 28 are arranged in different planes of rotation from each other and from that in which the projection 26 is rotated, so that said projections 27 and 28 will not engage the stop 29 during the rotation of the member 25 with the shaft 10.

Disposed adjacent to the cylindrical member 25 are two electrically operated stops 30 and 31 constructed and arranged to be moved against the surface of the cylindrical member 25 at certain times in the operation of the device to be engaged respectively by the projections 27 and 28.

The stop 30 is attached to the armature 32 of a solenoid 33 which, when energized, causes said armature to move said stop against said cylindrical member. The stop 31 is attached to the armature 34 of a solenoid 35 which, when energized, causes the stop 31 to be moved against the periphery of the member 25 to engage a projection 28.

Springs 36 yieldingly retain the stops 30 and 31 out of engagement with the projections 27 and 28. The windings of the solenoid 33 are connected through a conductor 37, binding post 38 and conductor 39 with one pole of the push button switch 23. The other pole of said switch is connected directly with the battery 21; the other end of the coils of the solenoid 33 is grounded at 40 on the casing 11, permitting an electric current to pass through said casing to the coils of the solenoid 15 which is also grounded at 41 on said casing.

The electric current passes through the solenoid 15 and a conductor 42, binding post 43 and conductor 44 to the battery 29, consequently when the switch 23 is closed an electric current will pass from the battery through said switch to the solenoid 33, energizing said solenoid and causing the stop 30 to move upwardly against the cylindrical member 25.

The current also passes through the solenoid 15, binding post 30 and conductor 40 back to said battery. At it passes through the solenoid 15 and energizes said solenoid the armature thereof will be drawn downwardly against the action of the spring 17 effecting the rotation of the member 9 or at least enough to move the projection 27 into contact with the stop 30 which prevents further rotation of the member 9.

The projection 27 and the stop 30 contact at the right time to cause the signal member bearing the word "Left" to register with the opening 12 of the casing and this signal member will be held at such a position just as long as the switch 23 is kept closed by the pressure of the operator's fingers thereon, but immediately upon the removal of the pressure therefrom said switch will be automatically opened by means of the spring 45 of said switch returning to its normal position.

When the solenoid 15 is deënergized the spring 17 causes the armature 16 to move upwardly to rotate the shaft 10 and rotary member 9 until the projection 26 engages the stop 29. This brings the signal member bearing the words "Traffic signal" into alinement with the opening 12 which is the normal condition of the device.

The solenoid 35 is grounded at 46 on portions of the casing 11. The other end of the solenoid 35 is connected by the conductor 47 with a binding post 48, said binding post being, in turn, connected by a conductor 49 with one pole of the push button switch 24, the other pole of said switch being connected directly with the battery 21.

Upon the closing of the switch 24 by the pressing of the button "S" thereof an electric current will pass from the battery through the solenoid 35 energizing said solenoid and causing the stop 31 to be moved upwardly against the cylindrical member 25 in the path of the projection 28. Continuing, the current passes through the casing, as hereinbefore described, into the solenoid 15, energizing said solenoid and causing the rotary member 9 to turn until the projection 28 engages the stop 31. This movement of said rotary member brings the signal member bearing the word "Stop" into alinement with the opening 12, thereby indicating to persons who may be at the rear of the vehicle bearing said signal that a stop is to be made.

When pressure is released from the push button "S" the circuit controlled thereby will be broken, the solenoid deënergized and the rotary member 9 permitted to be returned by the spring 16 to its normal position. When a right turn is to be made the button "R" is pressed, operating the switch 22 and causing a circuit to be made, including the battery 21, conductor 44, solenoid 15, thence through the frame to a binding post 50, which is, in turn, connected by a conductor 51 with one pole of the switch 22, the other pole of said switch being connected directly with the battery 21.

The movement of the rotary member 9 will continue under the inspiration received by the closing of the circuit 32 by the electric current passing therethrough until the projection 26 engages a stop 52 arranged in said casing and arranged so as to permit said rotary member to rotate substantially three-quarters of a rotation or a distance sufficient to bring the last of the signal members into alinement with the opening 12.

For convenience, in construction the casing 11 is formed in three parts or sections 53, 54 and 55. The portion 53 is the cylindrical portion within which the member 9 is arranged and has in its front wall the opening 12. The portion 54 is attached to one end of the portion 53 and contains the solenoid 15, armature 16, rack 18 and pinion 20, the portion thereof containing the solenoid 15 extending a substantial distance below the cylindrical portion 53.

The portion 55 is similar in construction to the portion 54 and is adapted to inclose the cylindrical member 25 on the end of the shaft 10 and to contain the two solenoids 33 and 35 the portion containing said solenoids extending below the casing, as does the portion containing the solenoid 15 of the compartment 54.

Figure 2:
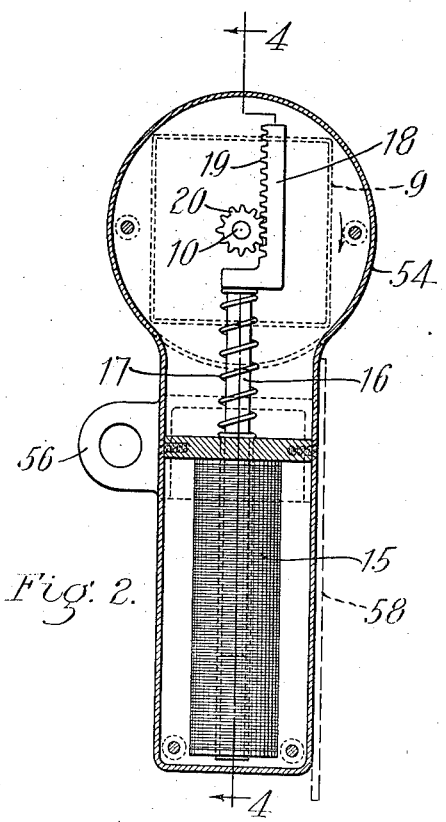
Fig. 2 is a section taken substantially on the line of Fig. 1, certain parts in said figure being shown in elevation, said figure illustrating the means for operating the member bearing the several direction indicating signals.
Figure 3:
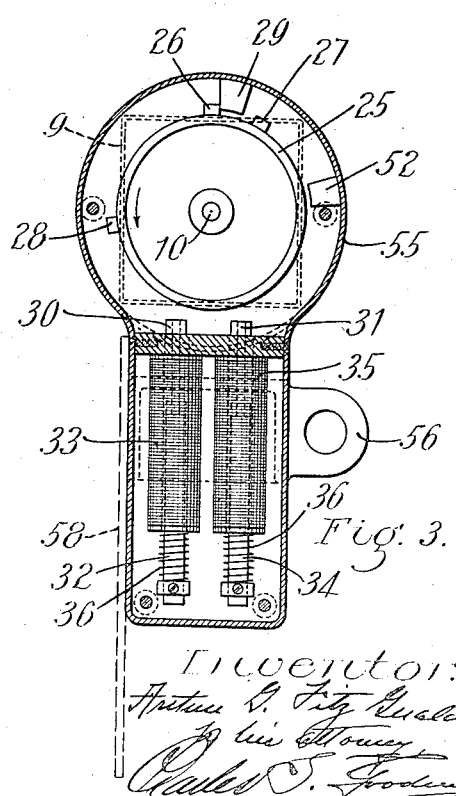
Fig. 3 is a section taken on the line 3—3 of Fig. 1, said figure illustrating the electrically operated means for varying the movements of the signal bearing member.

Extending between the depending portions of the members 53 and 54 is a supporting member 61 having lugs 56 extending rearwardly therefrom for use in supporting the entire casing. The supporting member 55 also has slots 57 in the front face thereof through which bolts may be extended for the purpose of securing the number plate 58 of the vehicle which is shown in dotted lines, Figs. 1, 2 and 3.

A lamp may be attached to the casing, preferably in the position shown in dotted lines in Fig. 1 and indicated by the numeral 59, this position being such that the rays of light which are emitted through an opening in the side 60 of the casing will shine directly upon the traffic signal and also upon the number plate, so that either one of the plates may be properly illuminated at night.

The general operation of the device hereinbefore described is as follows:

The signal member bearing the words "Traffic signal" is in alinement with the opening 12 so as to be easily discernible from the rear of the vehicle when the same is being driven along a straight road. Should the operator thereof desire to make a right turn he will press the push button "R" until the switch 22 is closed. The electric current from the battery 21 will thereby be permitted to pass along the conductor 51, binding post 50 and frame 61, which supports the binding post 50, into the solenoid 15, energizing said solenoid and drawing the armature 16 downwardly.

This movement of the armature depresses the spring 17 and rotates the rotary member 9. As there is no stop operating solenoid inserted within the electric circuit just referred to the movement of the member 9 will be unrestricted from the time the projection 26 leaves the stop 29 until it engages the stop 52 three-quarters of a rotation of the member 9 from said stop 29. This is sufficient to present the signal member bearing the word "Right" into alinement with the opening 12 of the casing and this signal member will be maintained in such a position just as long as the switch 22 is held closed and when the pressure is removed from the push button "R" the spring of said switch will cause said switch to automatically open, thus breaking said circuit deënergizing the solenoid 15 and permitting the spring 17 to return the member 9 to its normal position, displaying the signal bearing the words "Traffic signal".

When a left turn is to be made the operator presses the push button bearing the letter "L", thus closing the switch 23 and permitting the current to pass through the battery 21 along the conductor 39 to the solenoid 33. When this solenoid is energized its armature 32 will be elevated and the stop 30 moved into the path of the projection 27 upon the cylindrical member 25. The electric current also passes through the frame or casing, through the solenoid 15, energizing said solenoid and causing the member 9 to be rotated thereby until the projection 27 engages the stop 30 which is substantially one-half a rotation of the member 9.

This brings the signal member bearing the word "Left" into view before the opening 12, where it remains until pressure is removed from the push button "L", after which said rotary member 9 is returned to its normal position, as hereinbefore described.

When a stop is to be made the operator presses the button bearing the letter "S", thus closing the switch 24, permitting an electric current to pass from the battery 21 along the conductor 49 to the solenoid 35. The energizing of said solenoid causes the armature 34 bearing the stop 31 to move upwardly until said stop occupies a position in the path of the projection 28, whereupon the rotation of the member 9 will be limited to substantially one-fourth of a rotation or a distance sufficient to bring the signal member bearing the word "Stop" into view before the opening 12.

The removal of the pressure from the button "S" permits the electric circuit to be broken and the member 9 to be returned to its normal position, as hereinbefore described.

The present embodiment of the essential features of the invention and especially as relates to the minor details is sufficient to illustrate an operative device. It is not, however, intended to limit the invention to the specific arrangement of parts described and shown as numerous changes and alterations may be made in the construction of the several parts and in the operation thereof, without departing from the spirit and scope of the invention as defined in the following claim.

Having thus described my invention what I claim and desire by Letters Patent to secure is:

An indicating device having, in combination, a rotary member having a plurality of direction indicating signals upon the surface thereof, a pinion secured adjacent to one end of said rotary member and upon the exterior thereof, a solenoid, an armature for said solenoid, a rack secured to said armature and engaging said pinion adapted to be operated by said solenoid to rotate said rotary member, a cylindrical member secured adjacent to the other end of said rotary member, a plurality of laterally projecting members on said cylindrical member, a plurality of solenoids having armatures disposed in alinement respectively with said projecting members and with which they are also adapted to contact, a plurality of electric circuits each including one of said plurality of solenoids and the solenoid operatively connected with said pinion, and means for individually closing said electric circuits, whereby said rotary member may be rotated to display predetermined indicating signals thereon.

In testimony whereof I have hereunto set my hand in presence of two subscribing witnesses.

ARTHUR G. FITZ GERALD.

Witnesses:
CHARLES S. GOODING,
DANIEL A. ROLLINS.